United States Patent
Sinclair

(10) Patent No.: US 7,188,334 B1
(45) Date of Patent: Mar. 6, 2007

(54) VALUE-ORDERED PRIMARY INDEX AND ROW HASH MATCH SCAN

(75) Inventor: Paul L. Sinclair, Manhattan Beach, CA (US)

(73) Assignee: NCR Corp., Dayton, OH (US)

( * ) Notice: Subject to any disclaimer, the term of this patent is extended or adjusted under 35 U.S.C. 154(b) by 602 days.

(21) Appl. No.: 09/989,345

(22) Filed: Nov. 20, 2001

(51) Int. Cl.
    G06F 9/44 (2006.01)
    G06F 9/45 (2006.01)

(52) U.S. Cl. .................. 717/114; 717/116; 707/100

(58) Field of Classification Search ........ 717/114–116; 707/1, 3, 100–102, 200
    See application file for complete search history.

(56) References Cited

U.S. PATENT DOCUMENTS

| | | | |
|---|---|---|---|
| 5,682,535 A * | 10/1997 | Knudsen ................. | 717/117 |
| 5,790,861 A * | 8/1998 | Rose et al. .............. | 717/145 |
| 5,845,126 A * | 12/1998 | Ju et al. ................. | 717/114 |
| 5,978,791 A * | 11/1999 | Farber et al. ............ | 707/2 |
| 6,185,557 B1 * | 2/2001 | Liu ....................... | 707/4 |
| 6,219,826 B1 * | 4/2001 | De Pauw et al. ......... | 717/116 |
| 6,266,660 B1 * | 7/2001 | Liu et al. ............... | 707/3 |
| 6,389,428 B1 * | 5/2002 | Rigault et al. .......... | 707/104.1 |
| 6,484,160 B1 * | 11/2002 | Richard et al. .......... | 707/2 |
| 6,532,467 B1 * | 3/2003 | Brocklebank et al. .... | 707/100 |
| 6,549,895 B1 * | 4/2003 | Lai ....................... | 707/2 |
| 6,694,506 B1 * | 2/2004 | LeBlanc et al. .......... | 717/108 |
| 6,708,177 B2 * | 3/2004 | Schwarcz ................ | 707/100 |
| 6,748,373 B2 * | 6/2004 | Messinger et al. ....... | 707/2 |
| 6,757,671 B1 * | 6/2004 | Galindo-Legaria et al. .... | 707/3 |
| 6,917,943 B2 * | 7/2005 | Butler ................... | 707/100 |
| 6,928,640 B2 * | 8/2005 | Schlussman ............. | 717/137 |

OTHER PUBLICATIONS

Getta, "On adaptive and online data integration", IEEE ICDE, pp. 1212-1219, 2005.*
Oliveira et al, "Revisting 1 copy equivalence in clustred databases", ACM SAC, pp. 728-732, 2006.*
Chan et al, "incremental update to aggregated information for data warehouses over internet", ACM DOLAP, pp. 57-64, 2000.*
Bluespec: "BSV 101: Desiging a counter", pp. 1-19, 2005, copyright 2005 Bluespec, Inc.*

* cited by examiner

*Primary Examiner*—Anil Khatri
(74) *Attorney, Agent, or Firm*—Baker Botts, LLP; John D. Cowart; Charles Q. Maney

(57) ABSTRACT

A method for joining two value-ordered primary index tables T1 and T2 in response to a join command is disclosed. T1 and T2 each include rows. T1 and T2 each have a first row. A subset of the rows of T1 is loaded into memory. The subset is consecutive and includes the first row of T1. The first row of T2 is loaded into memory. The loaded row of T2 is compared to the loaded rows of T1. If there is a match, it is output. If there is not a match, that lack is recorded. A next consecutive row of T2 is loaded into memory. The comparison, output, recording, and loading of consecutive T2 rows is repeated. New rows of T1 are loaded into memory. The new rows are consecutive and are consecutive with the previously loaded rows of T1. The combination of a repetition of comparison, output, recording, and loading of consecutive T2 rows with loading new rows of T1 into memory is repeated.

50 Claims, 10 Drawing Sheets

VALUE-ORDERED PRIMARY INDEX AND ROW HASH MATCH SCAN

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users of relational database systems require the minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common query. If the data is properly organized, performance can be improved by searching a part of the data for queries that can take advantage of that organization. If the data is not organized in any way, it will often need to be searched in its entirety to satisfy a query or copied and restructured into a useful organization.

Given a particular change in the organization of data, particular types of searches may be adversely impacted in terms of efficiency if they are performed without any adjustment. Many factors may be addressed to adjust a search type that is to be performed with respect to a new organization of data. Such factors include but are not limited to the manner in which the data is stored, the file system that identifies the location of the data and various other information about the data, and the desired outcome of the search. The efficiency of a search can be improved by considering and addressing one or more of those factors.

SUMMARY

In general, in one aspect the invention includes a method for joining two value-ordered primary index tables T1 and T2 in response to a join command. T1 and T2 each include rows. T1 and T2 each have a first row. A subset of the rows of T1 is loaded into memory. The subset is consecutive and includes the first row of T1. The first row of T2 is loaded into memory. The loaded row of T2 is compared to the loaded rows of T1. If there is a match, it is output. If there is not a match, that lack is recorded. A next consecutive row of T2 is loaded into memory. The comparison, output, recording, and loading of consecutive T2 rows is repeated. New rows of T1 are loaded into memory. The new rows are consecutive and are consecutive with the previously loaded rows of T1. The combination of a repetition of comparison, output, recording, and loading of consecutive T2 rows with loading new rows of T1 into memory is repeated.

In general, in another aspect, the invention includes a database system for joining two value-ordered primary index tables T1 and T2 in response to a join command. T1 and T2 each include rows. The database system includes one or more nodes and a plurality of CPUs, each of the one or more nodes providing access to one or more CPUs. The database system also includes a plurality of virtual processes, each of the one or more CPUs providing access to one or more virtual processes. Each process is configured to manage data, including rows of tables T1 and T2, stored in one of a plurality of data-storage facilities, where T1 and T2 each have a first row in each data storage facility. The system includes a reading join component configured to join rows from T1 and T2 by implementing the following process. A subset of the rows of T1 is loaded into memory. The subset is consecutive and includes the first row of T1. The first row of T2 is loaded into memory. The loaded row of T2 is compared to the loaded rows of T1. If there is a match, it is output. If there is not a match, that lack is recorded. A next consecutive row of T2 is loaded into memory. The comparison, output, recording, and loading of consecutive T2 rows is repeated. New rows of T1 are loaded into memory. The new rows are consecutive and are consecutive with the previously loaded rows of T1. The combination of a repetition of comparison, output, recording, and loading of consecutive T2 rows with loading new rows of T1 into memory is repeated.

In general, in another aspect, the invention includes a computer program, which is stored in a tangible medium, for joining two value-ordered primary index tables T1 and T2 in response to a join command. T1 and T2 each has rows and T1 and T2 each has a first row. The program includes executable instructions that cause a computer to implement the following process. A subset of the rows of T1 is loaded into memory. The subset is consecutive and includes the first row of T1. The first row of T2 is loaded into memory. The loaded row of T2 is compared to the loaded rows of T1. If there is a match, it is output. If there is not a match, that lack is recorded. A next consecutive row of T2 is loaded into memory. The comparison, output, recording, and loading of consecutive T2 rows is repeated. New rows of T1 are loaded into memory. The new rows are consecutive and are consecutive with the previously loaded rows of T1. The combination of a repetition of comparison, output, recording, and loading of consecutive T2 rows with loading new rows of T1 into memory is repeated.

Other features and advantages will become apparent from the description and claims that follow.

DETAILED DESCRIPTION

Figure 1:
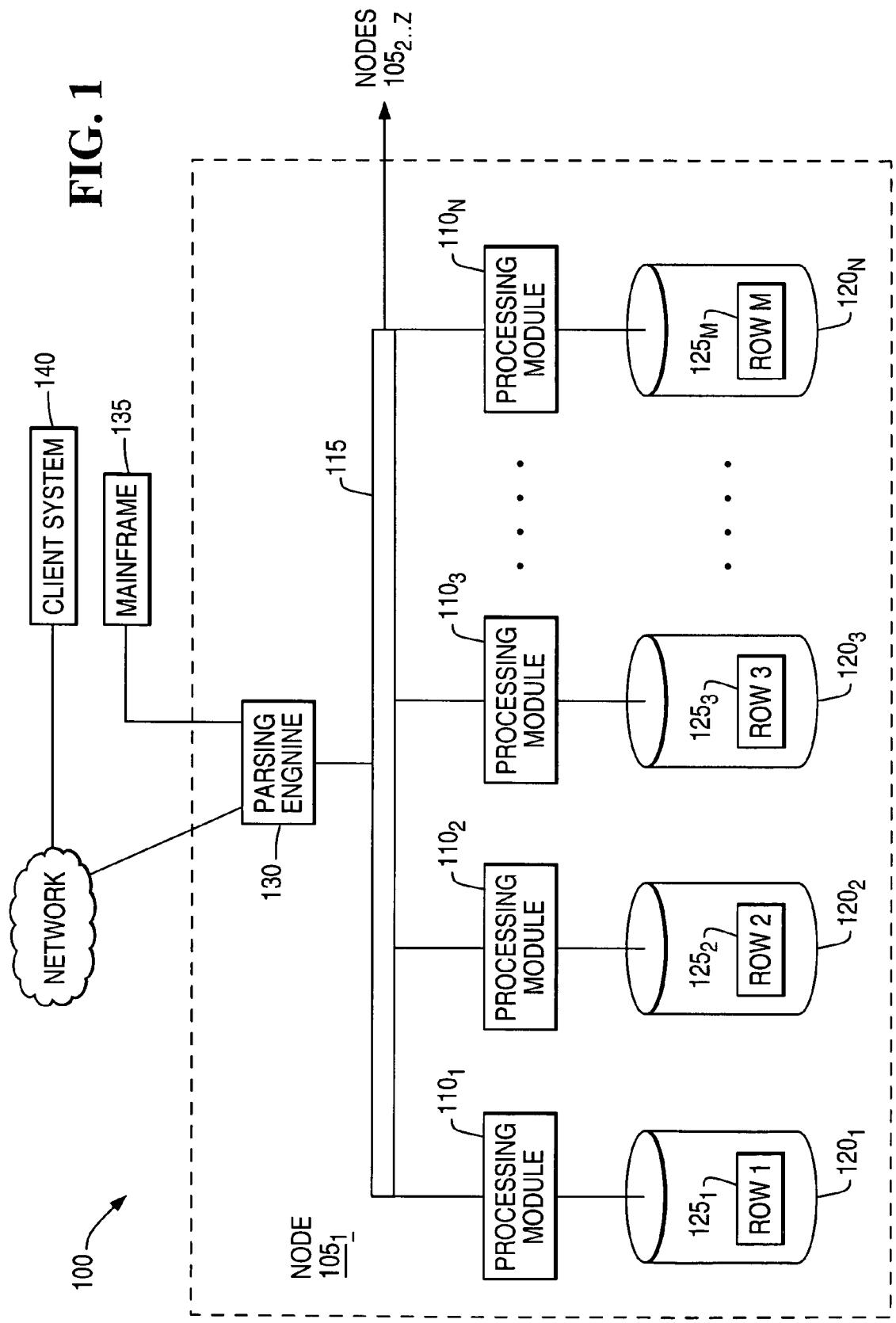
FIG. 1 is a block diagram of a node of a parallel processing system.

The value-ordered primary index ("VOPI") and row hash match scan technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node 105$_1$ includes one or more processing modules 110$_{1...N}$, connected by a network 115, that manage the storage and retrieval of data in data-storage facilities 120$_{1...N}$. Each of the processing modules 110$_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 110$_{1...N}$ manages a portion of a database that is stored in a corresponding one of the data-storage facilities 120$_{1...N}$. Each of the data-storage facilities 120$_{1...N}$ includes one or more disk drives. The DBS may include multiple nodes 105$_{2...N}$ in addition to the illustrated node 105$_1$, connected by extending the network 115.

The system stores data in one or more tables in the data-storage facilities 120$_{1...N}$. The rows 125$_{1...Z}$ of the tables are stored across multiple data-storage facilities 120$_{1...N}$ to ensure that the system workload is distributed evenly across the processing modules 110$_{1...N}$. A parsing engine 130 organizes the storage of data and the distribution of table rows 125$_{1...Z}$ among the processing modules 110$_{1...N}$. The parsing engine 130 also coordinates the retrieval of data from the data-storage facilities 120$_{1...N}$ in response to queries received from a user at a mainframe 135 or a client computer 140. The DBS 100 usually receives queries and commands to build tables in a standard format, such as SQL.

In one implementation, the rows 125$_{1...Z}$ are distributed across the data-storage facilities 120$_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities 120$_{1...N}$ and associated processing modules 110$_{1...N}$ by a hash bucket map. The characteristics of the columns chosen for the primary index determine how evenly the rows are distributed.

In one implementation, nodes are defined physically, in that the processors and storage facilities associated with a node are generally physically proximate as well. For this reason, it is possible that a hardware or software problem encountered by a node will result in the unavailability of the processor and storage resources associated with that node.

Figure 2:
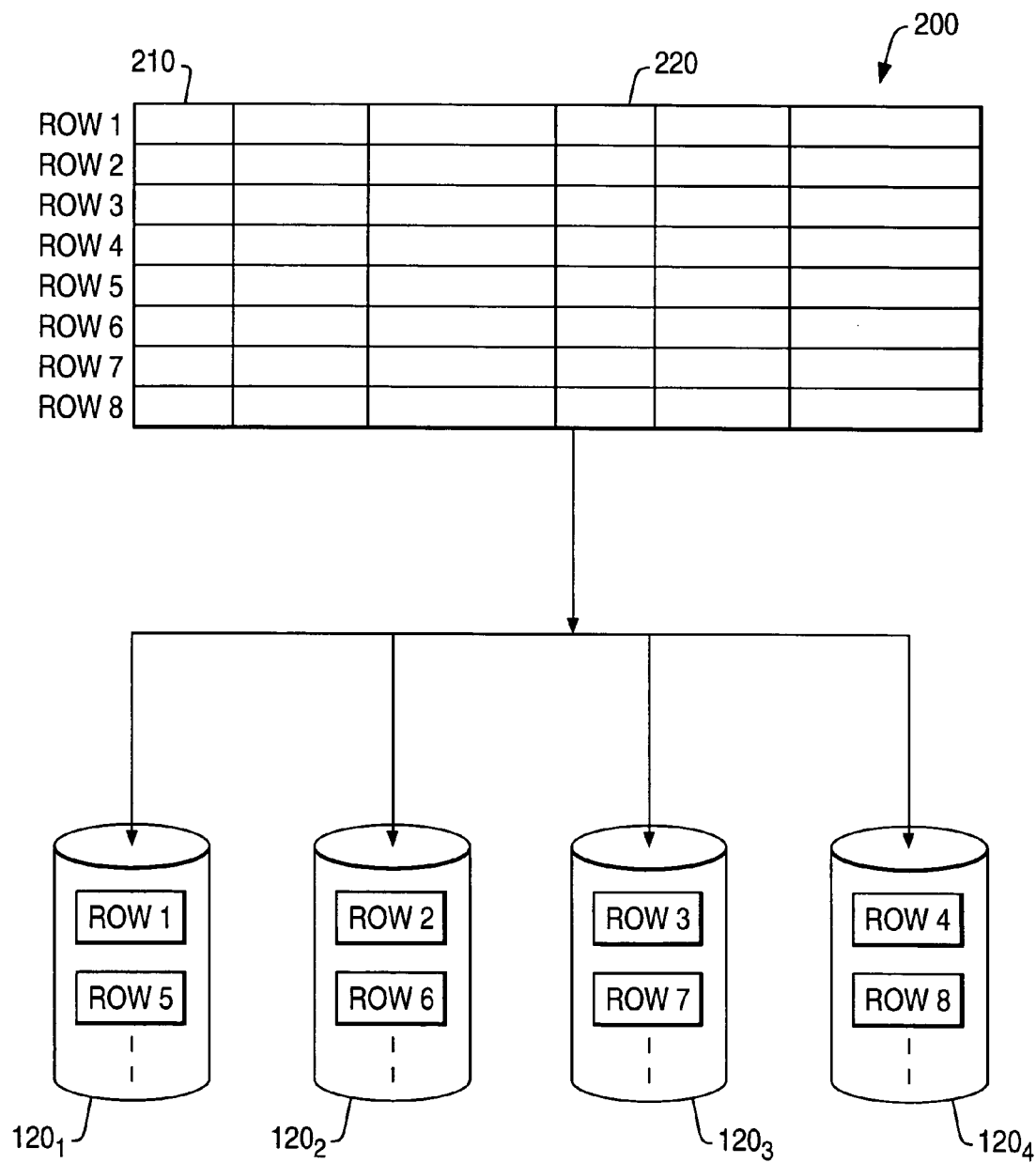
FIG. 2 is a flow diagram of a table distribution process.

FIG. 2 shows one implementation of how the rows of a table are distributed. The table 200 contains a plurality of rows and is stored in a plurality of data storage facilities 120$_{1-4}$ by the parsing engine 130, shown in FIG. 1. For example, two columns 210, 220 can be designated as the primary index when the table is created. The hash function is then applied to the contents of columns 210, 220 for each row. The hash bucket portion of the resulting hash value is mapped to one of the data storage facilities 120$_{1-4}$ and the row is stored in that facility. For example, if the primary index indicates a column containing a sequential row number and the hash function is the sum of the value one and the remainder when the sequential row number is divided by four, the first eight rows will be distributed as shown in FIG. 2.

Queries involving the values of columns in the primary index can be efficiently executed because the processing module 110$_n$ having access to the data storage facility 120$_n$ that contains the row can be immediately determined. For example, referring to FIG. 2, if values from row 2 are desired, the parsing engine 130 can apply the hashing function to determine that only processing module 110$_2$ needs to be used. As another example, an equality join between two tables that have the same primary index columns is more efficient. All of the rows that need to be joined are found in the same data storage facility 120$_n$ and no movement of information from rows between the data storage facilities is necessary.

Figure 3:
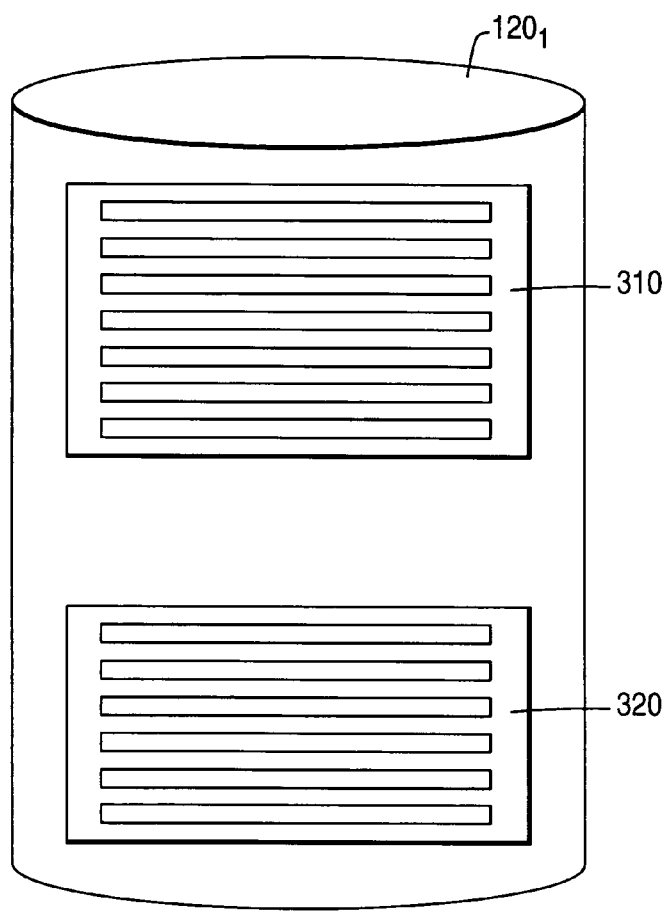
FIG. 3 illustrates an example of rows from two value-ordered tables residing in a data storage facility.

While the primary index of a table can be chosen for equality joins, for example the order number column of an order table, additional design features can make range searches, for example a range of dates from the date column, more efficient. Referring to FIG. 3, a database storage facility 120$_1$ is shown. Rows from two VOPI tables 310 and 320 are organized within the storage facility 120$_1$ in accordance with a row identification (row ID) that can include values associated with a ordering column as well as values associated with a uniqueness value. The rows stored in the storage facility 120$_1$ are organized at a top level by the table with which they are associated. For a given table, the rows are then organized by one or more columns designated as value-ordered in the table definition. As a result, the value that is used to determine the storage facility in which a row is stored is different from the value that is used to determine where in the facility the row is stored relative to other rows of that table.

For one implementation of joining two tables or other data structures in a DBS 100, called a merge join, rows to be joined are (1) within the same data storage facility and (2) organized and processed by the associated processing module such that they can be matched in accordance with whatever conditions are specified by the join command, i.e., the join conditions. When one of the join conditions is on the one or more primary index columns, the hash result of which is used to distribute rows among storage facilities, the first condition is satisfied. With regard to the second condition, if the rows are sorted in hash order in each storage facility, the rows can easily be matched in order. When one of the join conditions is on the one or more primary index columns, rows with the same hash value from one table or data structure can only potentially match with rows with the same hash value from the other table or data structure, because identical primary index column values result in identical hash values. Identical hash values, however, do not necessarily indicate identical primary index column values, because more than one primary index column value can result in the same hash value. Such primary index column values are sometimes referred to as hash synonyms. A row hash match scan method skips over rows from one table that do not have rows with corresponding hash values in the other table. For example, if on average there are 4 rows with the same hash in each table, for each row in one table the join conditions will only need to be evaluated for the 4 rows in the other table with the same hash instead of all the rows in the other table.

In one implementation of a DBS table with a VOPI, the rows in each storage facility are ordered by a value different from the hash value. In one implementation, the value is a 4-byte or less numeric drawn from one or more columns. As a result, rows with the same hash value may be stored separately rather than together as they would be if they were ordered only by hash. For example, a VOPI order table can specify an order_number column as the primary index column while specifying an order_date column as the column that will provide values for ordering rows in storage facilities. The rows of such an order table would be distributed to data storage facilities based on the result of applying the hash function to the order number for each row. Within each data storage facility, however, the rows would be organized in accordance with the order date for each row. One option for executing a join command specifying a condition on the primary index columns in such a table is to copy the table rows from each data storage facility and sort the copied rows by hash so that the row hash match scan method can be performed on the sorted copy. For a table that is not VOPI and has a primary index on the join columns, this extra copying and sorting is unnecessary and the join can take place directly from the storage data structure.

Figure 4:
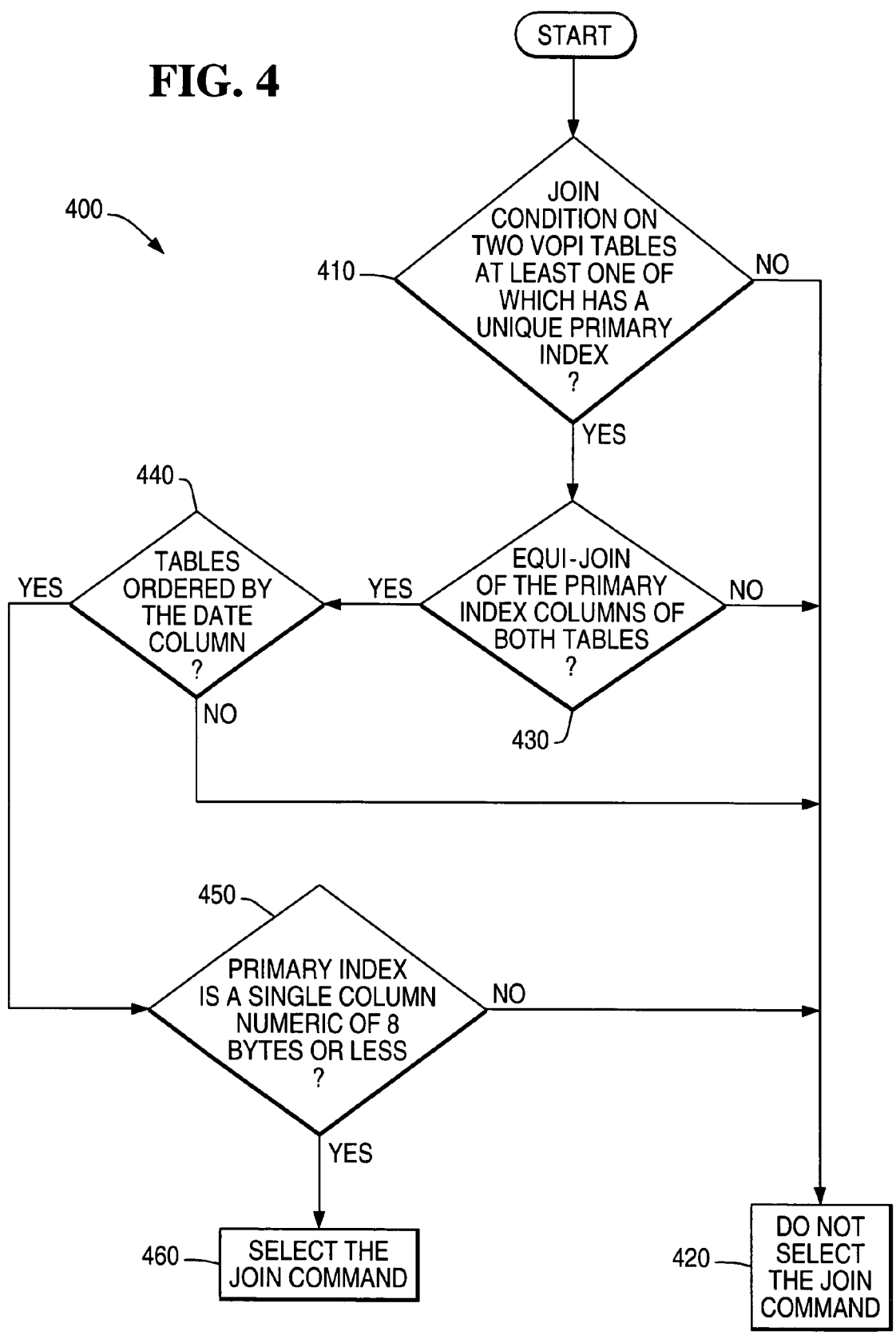
FIG. 4 is a flow diagram of a join command selection process.

As depicted in FIG. 4, one implementation of a process for selecting join commands 400 for a VOPI read join process includes evaluating several conditions. In this particular implementation if any of the conditions are not met, the join command will not be selected 420 and the copying and sorting by hash described above, or some other join method, can be used to execute the join command. The join command is checked to see if it joins two VOPI tables, at least one of which has a unique primary index ("UPI") 410. A primary index is unique for a table if no two rows in the table have the same value in the one or more primary index columns. The join command is also checked to see if an equi-join of the primary index columns of both tables is specified 430. An equi-join is a join that requires that the values in the columns are equal. Thus, to meet the condition, rows in the first table are only matched to rows in the second table if the values in the primary index of each row are identical. Join commands are not selected if the VOPI tables that are specified are ordered by a column having values other than date values 440. The process also does not select join commands that specify VOPI tables with multiple primary index columns or primary index columns that do not contain numeric values of eight bytes or less 450. In alternate implementations, join commands are selected that do not meet the above conditions. For example, such a process could select a join command specifying two VOPI tables that are both ordered by a customer column.

One consideration that can be employed in selecting join commands 400 is whether the VOPI tables being joined are ordered such that rows with the same primary index value, and therefore the same hash value, are scattered throughout both tables in the same manner, even though rows with similar hash values are not stored proximately. Such a correlation between the values in the ordering columns for the two tables for any particular value of the primary index columns, can be exploited to reduce the execution time for joining those tables based on an equi-join of the primary index columns. One possible illustration of that correlation is:

$$d1+low\_delta <= d2 <= d1+high\_delta \quad (1)$$

where d1 and d2 are values in the ordering columns of the VOPI tables for rows having the same primary index column value. The correlation is greater when the number of primary index column values that satisfy equation (1) for particular values of low_delta and high_delta is increased. The correlation is also greater when the difference between high_delta and low_delta is decreased for a given number of primary index column values. A correlation as expressed by equation (1) can exist whether or not there is a correlation between values in the primary index column and the ordering column for the rows of either table. In one implementation, the process determines whether the correlation is sufficiently present even after selecting a join command. If the correlation is absent to a predetermined degree, such a process can abort to a different execution plan for the join command.

Figure 5:
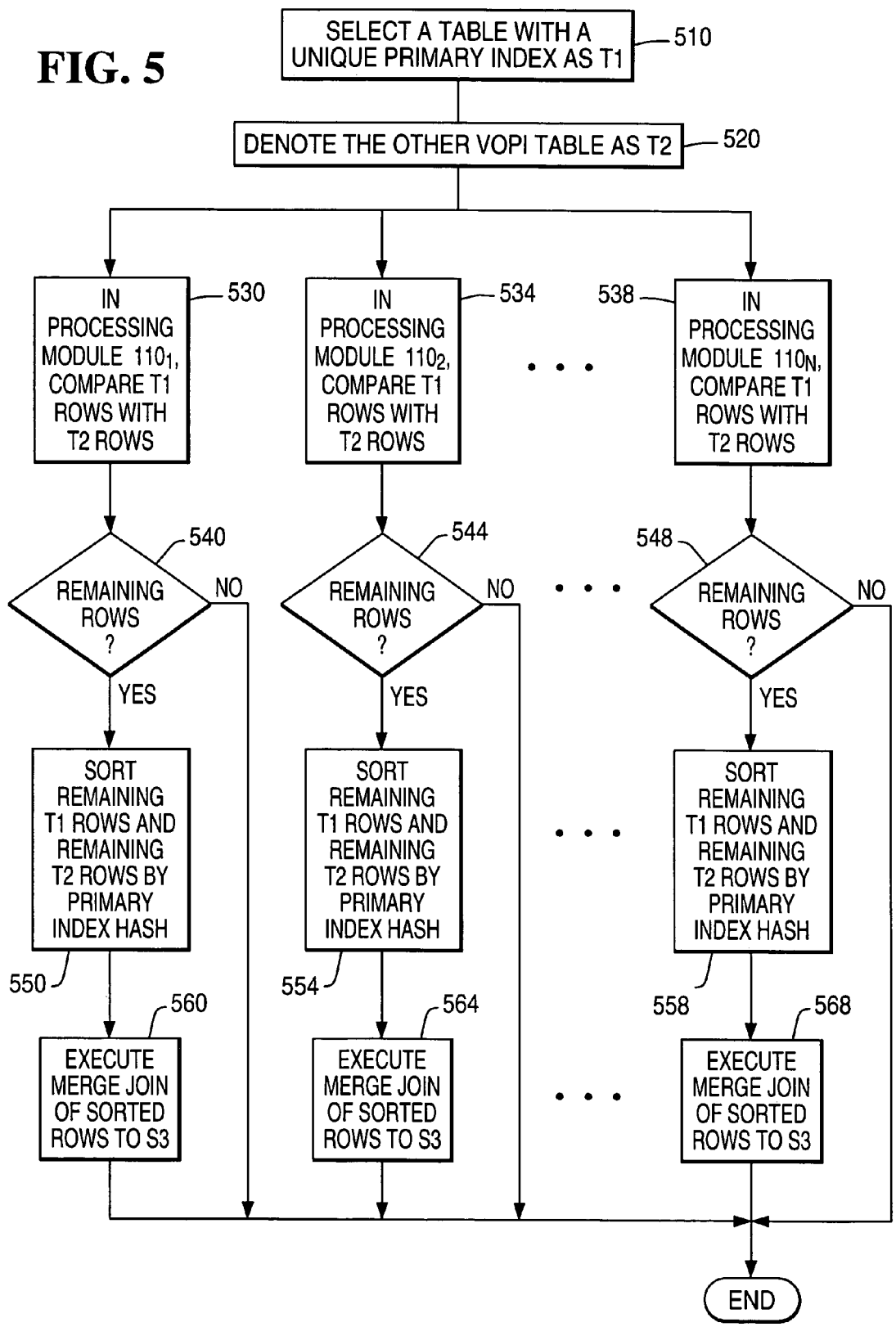
FIG. 5 is a flow diagram of a VOPI join process.

FIG. 5 is a flow diagram of a VOPI join process. In one implementation, the VOPI join process is applied only to selected join commands. A table with a UPI is selected as T1 510. If only one of the two tables to be joined has a UPI, that table is T1. If both tables have a UPI, either table can be denoted as T1 for purposes of proceeding with the process. The table that is not selected as T1 is T2 520. The denoting of tables as T1 and T2 is for ease of reference in describing the process. The VOPI join process is carried out in each processing module associated with a data storage facility containing at least one row of T1 and at least one row of T2 530, 534, 538 (described in additional detail in FIGS. 6–10). If there are rows of both tables remaining after comparison and matching, those rows are sorted by the hash of the primary index 550, 554, 558 (described in additional detail in FIG. 11). The sorted rows are then merge joined, because they are now ordered by hash rather than VOPI, and the result is output to spool S3 560, 564, 568, along with any result output by the VOPI comparison 530, 534, 538. In one implementation, if there are no remaining rows or the number of remaining rows is small, the join command execution performance is increased. In one implementation, if most or all of the rows are remaining, the execution performance is comparable to a conventional copy, sort and row hash match scan approach.

Figure 6:
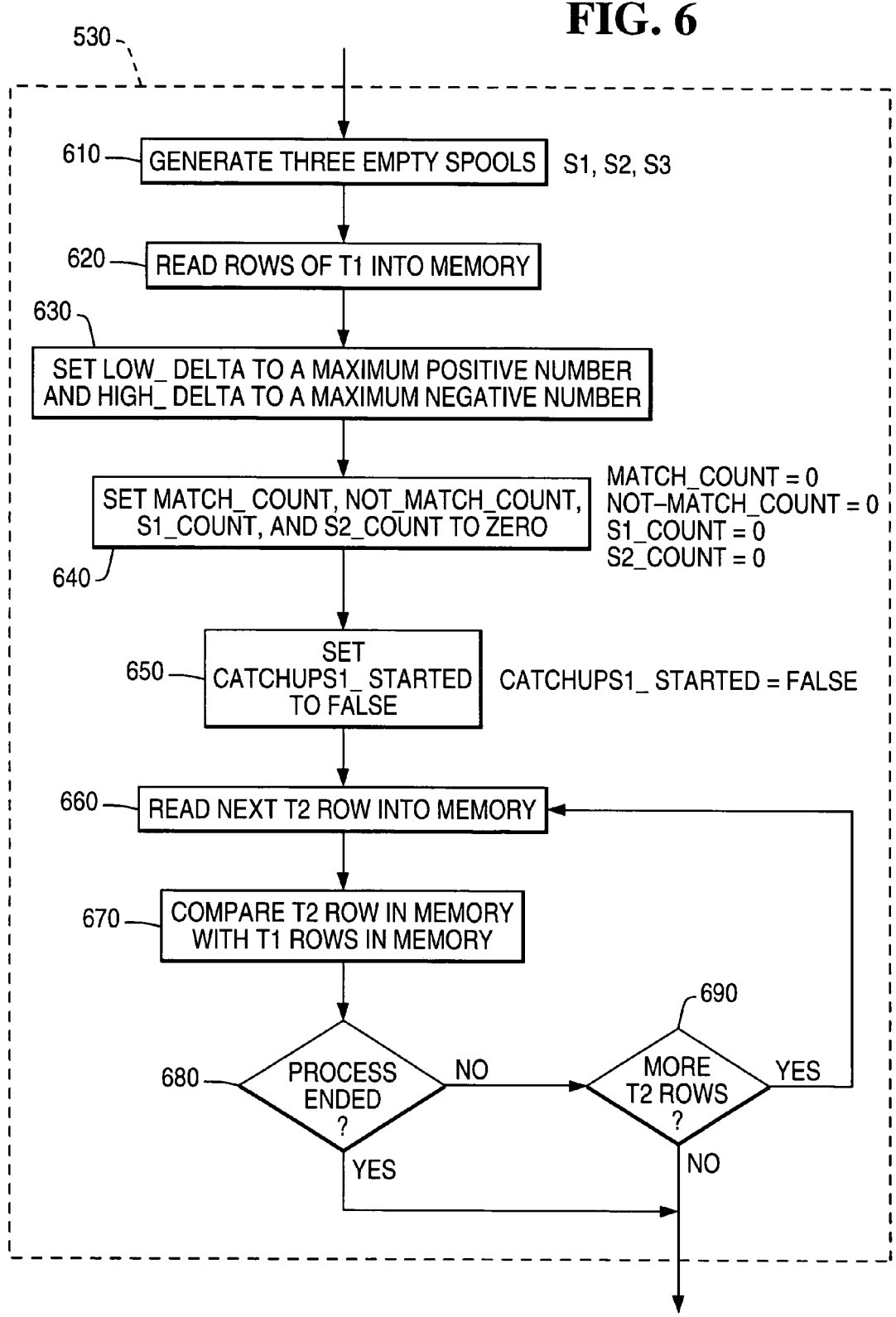
FIG. 6 is a flow diagram of an in-memory join subprocess.

FIG. 6 is a flow diagram of an in-memory join subprocess 530. The subprocess for other processing modules, for example processing module $110_2$, can follow the same approach with respect to rows of T1 and T2 in the data storage facility associated with that processing module. The subprocess creates three empty spools 610 identified by S1, S2, and S3. A number of rows of T1 are then read into memory 620. In one implementation, rows are read in groups according to the file system in which the rows are stored. For example, rows of T1 can be stored as blocks in the data storage facility. In one implementation, all the rows of T1 are read into memory. The amount of available memory can be taken into account in determining how many rows of T1 are read into memory. Values are assigned to track the correlation between ordering column values for particular primary index column values. In one implementation, low_delta is used to track the most negative difference between those values (starting at the opposite value), while high_delta is used to track the most positive difference between those values (starting at the opposite value) 630. In one implementation, those measurements are used to adjust future selection of join commands.

Four variables used to track the state of the process, match_count, not_match_count, S1_count, and S2_count, are initially set to zero 640. Another variable used to track the state of the process, catchupS1_started, is set to false. The next row of T2, available to that processing module, is then read into memory 660. The first time this will be the first row of T2. The rows of T2 are read in the order in which they are stored, which is in accordance with the ordering column values. In one implementation, rows are read in groups according to the file system in which the rows are stored. For example, rows of T2 can be stored as blocks in the data storage facility. In that implementation, the process selects the next row of T2 660, even when that row has already been read into memory. The selected row of T2 is then compared with the rows of T1 that are currently in memory 670 (described in additional detail in FIGS. 7–10). If that comparison ends the process 680 or there are no T2 rows after the current row 690, the subprocess is ended and further steps of the process shown in FIG. 5 are performed. Otherwise, the next row of T2 is selected and, if not already, loaded into memory.

Figure 7:
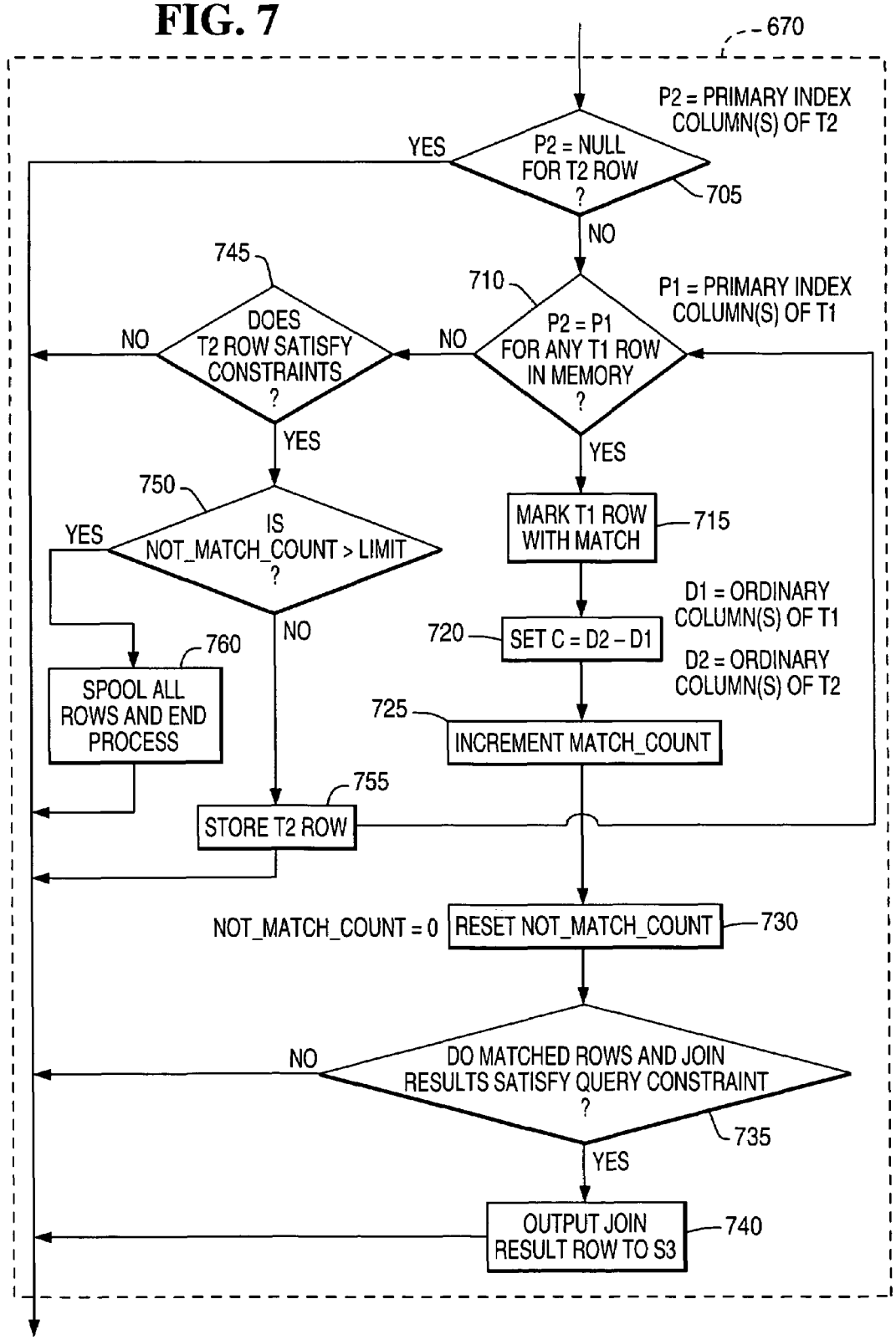
FIG. 7 is a flow diagram of a single row comparison subprocess.

FIG. 7 is a flow diagram of a single row comparison subprocess 670. The selected row of T2 is checked to see if its primary index column value, P2, is Null 705. If it is, there is no matched row in T1 and the subprocess of FIG. 6 continues. If P2 is not Null, it is compared to the primary index column values, P1, of the T1 rows in memory 710. There can be at most one match, because T1 has a UPI.

If there is a match, the matching row of T1 is marked in memory 715. In one implementation, rows are stored in blocks or other file system groups and the group containing the row is marked. A constant C is then set to the difference between the ordering column values in the matched rows 720. That constant can be used to update low_delta and high_delta. In one implementation, if c<low_delta, then set low_delta=c. If c>high_delta, set high_delta=c. If either d1 or d2 is Null, neither condition will be true and the deltas will not be changed. The variable match_count is incremented by one to keep count of the number of matches found 725. The variable not_match_count is reset to zero 730, so that failures to match are only counted when uninterrupted by successful matches. The matched rows of T1 and T2 and the row that combines the two in accordance with the join command are checked against any applicable join conditions in the join command 735. If all conditions are met, the combination row is output to spool S3 740. If the conditions are not met, the subprocess of FIG. 6 continues.

If the comparison of P2 to the various P1s 710 does not result in a match, the T2 row is checked to see if it satisfies any applicable constraints specified in the join command 745. If the T2 row does not satisfy those constraints, there is no matched row in T1 that would result in an output (though there may be a row with identical P1 that is not currently in memory) and the subprocess of FIG. 6 continues. If the T2 row does satisfy any applicable restraints, not_match_count is compared to a limit value 750. In one implementation, the limit value is 3; in other implementations, the limit value may be dynamically adjusted by the number of matches found and the total number of rows spooled to S2. If the limit value has not been exceeded, the unmatched T2 row is stored 755 (described in additional detail in FIGS. 8 and 9). Storing the unmatched T2 row 755 can be followed by another check against the T1 rows in memory 710 or by the subprocess of FIG. 6 continuing. If the limit value has been exceeded by not_match_count, all remaining rows of T1 and T2 are sent to spools S1 and S2, respectively, and the VOPI join process is ended 760 (described in additional detail in FIG. 10). Because the process is ended, that check 680 (shown in FIG. 6) will result in the process continuing in FIG. 5.

Figure 8:
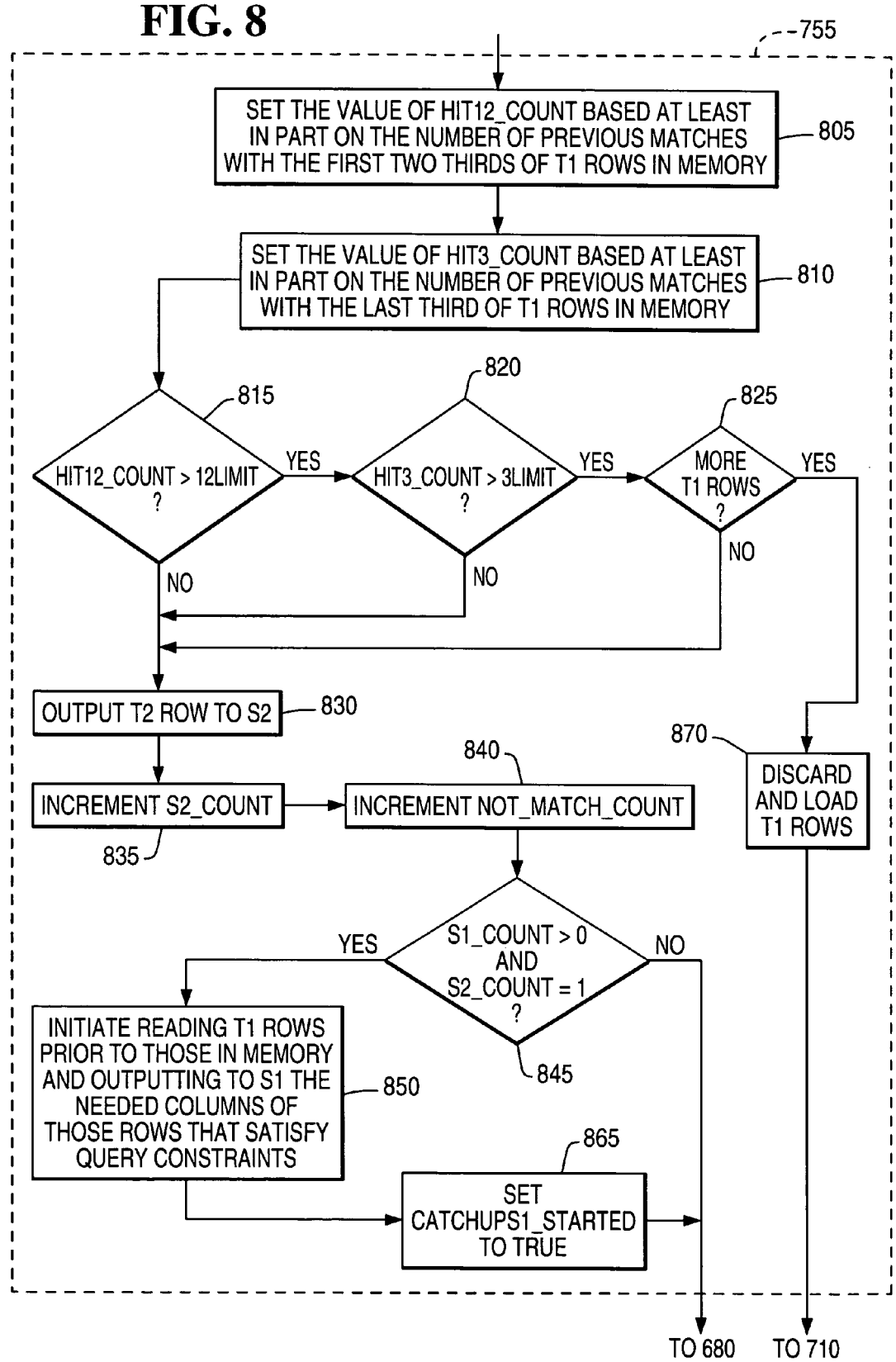
FIG. 8 is a flow diagram of a failure-to-match subprocess.

FIG. 8 is a flow diagram of a failure-to-match subprocess 755. A variable, hit12_count, is set to a value based at least in part on the number of previous matches in a first group of the T1 rows in memory. Another variable, hit3_count, is set to a value based at least in part on the number of previous matches in a second group in memory. In one implementation, rows are stored in blocks and hit12_count is set to the number of blocks with matches in the first two thirds of the data blocks for T1 in memory. In one implementation, rows are stored in blocks and hit3_count is set to the number of blocks with matches in the last one third of the data blocks for T1 in memory. The marking of rows or blocks 715 (see FIG. 7) can be used to determine the values of hit12_count and hit3_count. If those two variables are greater than two respective limits 815, 820 and there are more rows of T1 that have not yet been read into memory 825, the rows of T1 kept in memory are changed 870 (described in additional detail in FIG. 9) and P2 is then compared to P1s for the new group of T1 rows in memory 710 (see FIG. 7). In one implementation, the 12limit is n/3 and the 3limit is n/9 where n is the number of T1 blocks that are in memory. In another implementation, a different variable can be used to trigger a change in T1 rows maintained in memory.

If any of the three conditions 815, 820, 825 are not met, the needed columns of the T2 row are output to spool S2 830 and the S2_count variable is incremented by one 835. The not_match_count variable is also incremented by one 840. If S1_count is greater than zero and S2_count is equal to 1 845, a process of reading rows of T1 stored in order prior to those in memory is initiated 850. The process initiated also includes checking those rows against any applicable join command constraints, also called query constraints, and outputting the needed columns of the rows that meet the constraints to spool S1 850. The variable catchupS1_started is then set to true 865. The process then continues at 680 (see FIG. 6) as it also does if the evaluation of S1_count and S2_count 845 results in a negative result.

Figure 9:
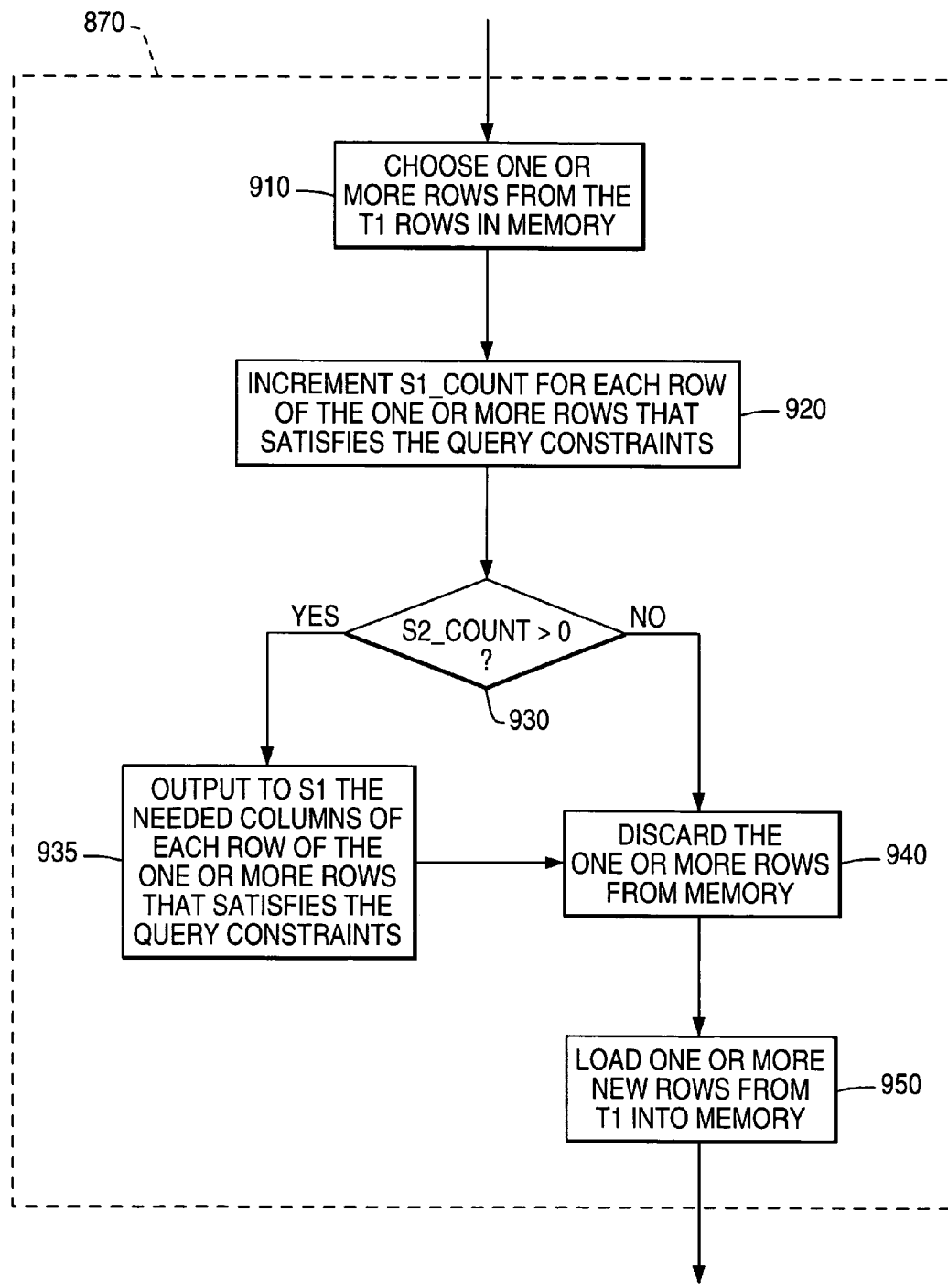
FIG. 9 is a flow diagram of discard and load table rows subprocess.

FIG. 9 is a flow diagram of discard and load table rows subprocess 870. One or more of the T1 rows in memory are chosen 910. S1_count is then incremented for each row of the one or more chosen rows that satisfy any applicable query constraints 920. If S2_count is greater than zero 930, the needed columns of the chosen rows that satisfy applicable constraints are output to spool S1 935. Regardless of the value of S2_count, the chosen rows are removed from memory 940 and one or more rows are loaded into memory from T1 950. In one implementation, the rows chosen are consecutive and the first rows of those currently in memory. In one implementation, the rows loaded into memory are consecutive and are consecutive from the last rows currently in memory. In one implementation, rows are removed and loaded in groups such as blocks.

Figure 10:
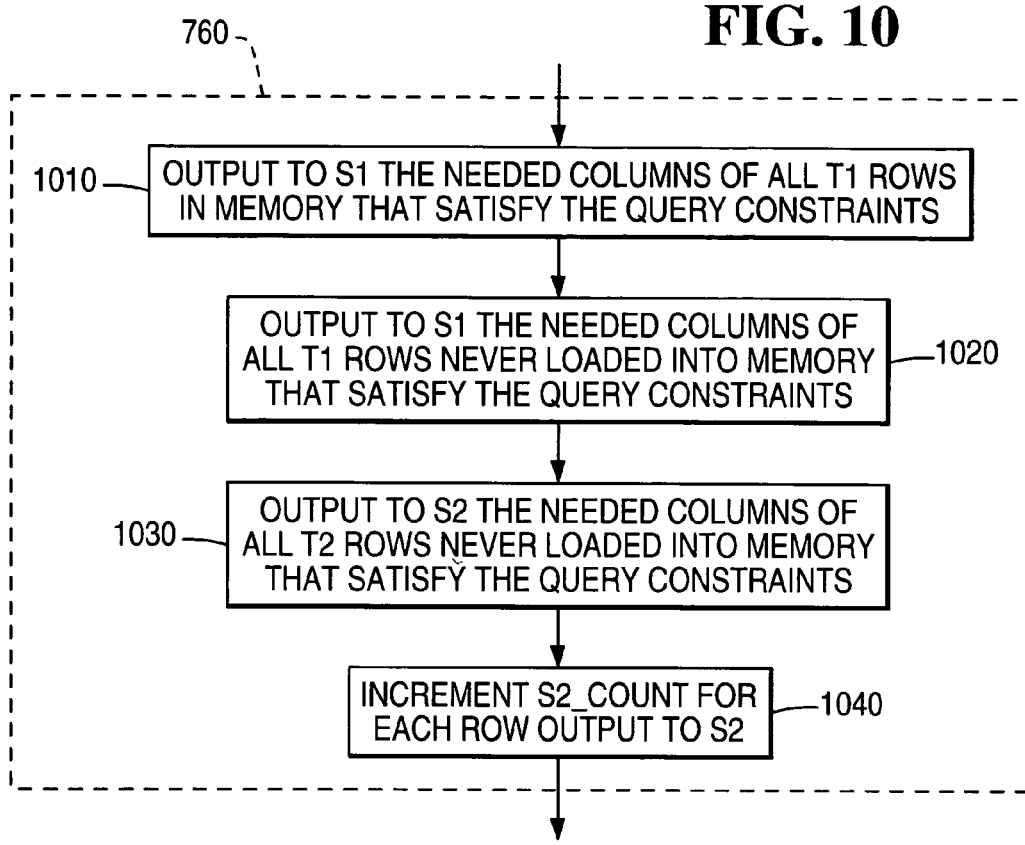
FIG. 10 is a flow diagram of an abort subprocess.

FIG. 10 is a flow diagram of an abort subprocess 760. The T1 rows currently in memory are checked against any applicable query constraints and the columns needed or requested by the query or join command of those rows satisfying the constraints are output to spool S1 1010. Similarly, T1 rows that have not been loaded into memory during the VOPI join process are checked against any applicable query constraints and the columns needed or requested by the query or join command of those rows satisfying the constraints are output to spool S1 1020. T2 rows that have not been loaded into memory during the VOPI join process are checked against any applicable query constraints and the columns needed or requested by the query or join command of those rows satisfying the constraints are output to spool S2 1030. S2_count is incremented for each row output to S2 1040. In one implementation, the outputting of rows from various tables and locations is performed simultaneously.

Figure 11:
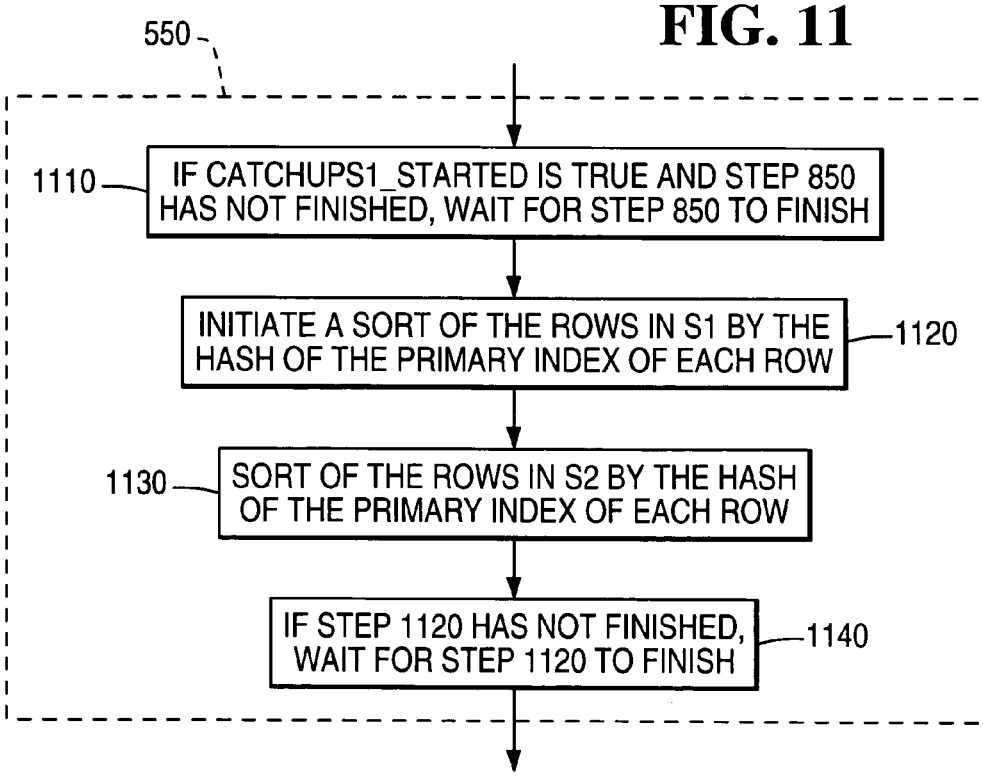
FIG. 11 is a flow diagram of a join column sort subprocess.

FIG. 11 is a flow diagram of a join column sort subprocess. If the variable catchupS1_started is true and step 850 has not finished, the process waits for step 850 to finish 1110. The process initiates a sort of the rows in spool S1 by the hash of the primary index of each row 1120. The process sorts the rows in spool S2 by the hash of the primary index of each row 1130. If step 1120 has not finished the process waits for it to finish 1140.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

What is claimed is:

1. A computer-implemented method for use in joining two value-ordered primary index tables T1 and T2 in a database system in response to a join command, T1 and T2 each having rows and T1 and T2 each having a first row, comprising the steps of:
   a. loading a subset of the rows of T1 into memory, where the subset is consecutive and includes the first row of T1;
   b. loading the first row of T2 into memory;
   c. comparing the loaded row of T2 to the loaded rows of T1;
   d. outputting a match, if any;
   e. incrementing a not-match counter if no match is found;
   f. loading a next consecutive row of T2 into memory;
   g. repeating steps c through f;
   h. loading new rows of T1 into memory, where the new rows are consecutive and are consecutive with the previously loaded rows of T1; and
   i. repeating steps c through h.

2. The method of claim 1, further comprising the step of:
   h'. discarding rows of T1 from memory, where the discarded rows are consecutive and include the first row that is in memory and wherein
   step i comprises repeating steps c through h and h'.

3. The method of claim 2, wherein the join command specifies one or more conditions on rows of T1 and discarded rows of T1 are stored if they meet the conditions.

4. The method of claim 1, further comprising the step of:
   f'. discarding the previous row of T2 from memory and wherein
   step g comprises repeating steps c through f and f' and step i comprises repeating steps c through h and f'.

5. The method of claim 1, wherein step h occurs after step c finds no matches when a predetermined number of matches have already occurred.

6. The method of claim 5, wherein the predetermined number of matches includes a first predetermined number of matches in a first portion of the loaded rows of T1 and a second predetermined number of matches in a second portion of the loaded rows of T1.

7. The method of claim 1, wherein the join command specifies one or more join columns for T1 and T2, further comprising the steps of:
   j. halting the repetition of steps a–h when the not-match counter exceeds a predetermined limit;
   k. sorting rows of T1 and T2 by their join columns, respectively; and
   l. merge joining the sorted rows of T1 and T2.

8. The method of claim 1, wherein T1 and T2 are ordered by a date value.

9. The method of claim 1, wherein T1 and T2 each have one or more primary index columns and the join command specifies equality of the primary index columns as a condition of the join.

10. The method of claim 9, wherein the one or more primary index columns is a single column containing numeric values of 8 bytes or less.

11. The method of claim 1, wherein T1 has a unique primary index.

12. The method of claim 1, wherein T1 and T2 are portions of larger tables and are stored in a single storage facility.

13. The method of claim 1, further comprising the step of:
   j. recording the maximum and minimum difference between the ordering columns of T1 and T2 for matching rows.

14. The method of claim 1, wherein the join command specifies one or more conditions on rows of T2 and incrementing the not-match counter comprises incrementing the not-match counter only when the loaded row of T2 meets the conditions.

15. The method of claim 1, wherein the join command specifies one or more join columns for T1 and T2, further comprising the steps of:
   j. resetting the not-match counter in the event of a match;
   k. halting the repetition of steps a–h when the not-match counter exceeds a predetermined limit;
   l. sorting rows of T1 and T2 based at least in part on their join columns, respectively; and
   m. merge joining the sorted rows of T1 and T2.

16. The method of claim 15, wherein the rows of T1 and T2 are sorted by a hash of their join columns.

17. The method of claim 1, wherein the join command specifies one or more conditions on rows of T1, rows of T2, and combined rows of T1 and T2, and outputting a match comprises outputting a combined row including one or more columns from the matched rows of T1 and T2 if each of the matched rows meets the conditions specified for rows from that table and the combined row meets the conditions for combined rows.

18. A database system for joining two value-ordered primary index tables T1 and T2 in response to a join command, T1 and T2 each having rows, the system comprising:
   one or more nodes;
   a plurality of CPUs, each of the one or more nodes providing access to one or more CPUs;
   a plurality of virtual processes, each of the one or more CPUs providing access to one or more virtual processes;
   each virtual process configured to manage data, including rows of tables T1 and T2, stored in one of a plurality of data-storage facilities, where T1 and T2 each have a first row in each data storage facility;
   a reading join component configured to join rows from T1 and T2 by:
   a. loading a subset of the rows of T1 into memory, where the subset is consecutive for rows in that data-storage facility and includes the first row of T1;
   b. loading the first row of T2 into memory;
   c. comparing the loaded row of T2 to the loaded rows of T1;
   d. outputting a match, if any;
   e. incrementing a not-match counter if no match is found;

f. loading a next consecutive row for rows in that data-storage facility of T2 into memory;

g. repeating steps c through f;

h. loading new rows of T1 into memory, where the new rows are consecutive for rows in that data-storage facility and are consecutive for rows in that data-storage facility with the previously loaded rows of T1; and i. repeating steps c through h.

19. The system of claim 18, wherein the reading join component is configured to join rows from T1 and T2 by:

h'. discarding rows of T1 from memory, where the discarded rows are consecutive for rows in that data-storage facility and include the first row that is in memory and wherein step i comprises repeating steps c through h and h'.

20. The system of claim 19, wherein the join command specifies one or more conditions on rows of T1 and discarded rows of T1 are stored if they meet the conditions.

21. The system of claim 18, wherein the reading join component is configured to join rows from T1 and T2 by:

f'. discarding the previous row of T2 from memory and wherein step g comprises repeating steps c through f and f' and step i comprises repeating steps c through h and f'.

22. The system of claim 18, wherein step h occurs after step c finds no matches when a predetermined number of matches have already occurred.

23. The system of claim 22, wherein the predetermined number of matches includes a first predetermined number of matches in a first portion of the loaded rows of T1 and a second predetermined number of matches in a second portion of the loaded rows of T1.

24. The system of claim 18, wherein the join command specifies one or more join columns for T1 and T2 and the reading join component is configured to join rows from T1 and T2 by:

j. halting the repetition of steps a–h when the not-match counter exceeds a predetermined limit;

k. sorting rows of T1 and T2 by their join columns, respectively; and merge joining the sorted rows of T1 and T2.

25. The system of claim 18, wherein T1 and T2 are ordered by a date value.

26. The system of claim 18, wherein T1 and T2 each have one or more primary index columns and the join command specifies equality of the primary index columns as a condition of the join.

27. The system of claim 26, wherein the one or more primary index columns is a single column containing numeric values of 8 bytes or less.

28. The system of claim 18, wherein T1 has a unique primary index.

29. The system of claim 18, wherein the reading join component is configured to join rows from T1 and T2 by:

j. recording the maximum and minimum difference between the ordering columns of T1 and T2 for matching rows.

30. The system of claim 18, wherein the join command specifies one or more conditions on rows of T2 and incrementing the not-match counter comprises incrementing the not-match counter only when the loaded row of T2 meets the conditions.

31. The system of claim 18, wherein the join command specifies one or more join columns for T1 and T2, and the reading join component is configured to join rows from T1 and T2 by:

j. resetting the not-match counter in the event of a match;

k. halting the repetition of steps a–h when the not-match counter exceeds a predetermined limit;

sorting rows of T1 and T2 based at least in part on their join columns, respectively; and m. merge joining the sorted rows of T1 and T2.

32. The system of claim 31, wherein the rows of T1 and T2 are sorted by a hash of their join columns.

33. The system of claim 18, wherein the join command specifies one or more conditions on rows of T1, rows of T2, and combined rows of T1 and T2, and outputting a match comprises outputting a combined row including one or more columns from the matched rows of T1 and T2 if each of the matched rows meets the conditions specified for rows from that table and the combined row meets the conditions for combined rows.

34. A computer program, stored in a tangible medium, for joining two value-ordered primary index tables T1 and T2 in response to a join command, T1 and T2 each having rows and T1 and T2 each having a first row, the program comprising executable instructions that cause a computer to:

a. load a subset of the rows of T1 into memory, where the subset is consecutive and includes the first row of T1;

b. load the first row of T2 into memory;

c. compare the loaded row of T2 to the loaded rows of T1;

d. output a match, if any;

e. increment a not-match counter if no match is found;

f. load a next consecutive row of T2 into memory;

g. repeat steps c through f;

h. load new rows of T1 into memory, where the new rows are consecutive and are consecutive with the previously loaded rows of T1; and i. repeat steps c through h.

35. The computer program of claim 34, further comprising executable instructions that cause a computer to:

h'. discard rows of T1 from memory, where the discarded rows are consecutive and include the first row that is in memory and wherein step i comprises repeating steps c through h and h'.

36. The computer program of claim 35, wherein the join command specifies one or more conditions on rows of T1 and discarded rows of T1 are stored if they meet the conditions.

37. The computer program of claim 34, further comprising executable instructions that cause a computer to:

f'. discard the previous row of T2 from memory and wherein step g comprises repeating steps c through f and f' and step i comprises repeating steps c through h and f'.

38. The computer program of claim 34, wherein step h occurs after step c finds no matches when a predetermined number of matches have already occurred.

39. The computer program of claim 38, wherein the predetermined number of matches includes a first predetermined number of matches in a first portion of the loaded rows of T1 and a second predetermined number of matches in a second portion of the loaded rows of T1.

40. The computer program of claim 34, wherein the join command specifies one or more join columns for T1 and T2, further comprising executable instructions that cause a computer to:

j. halt the repetition of steps a–h when the not-match counter exceeds a predetermined limit;

k. sort rows of T1 and T2 by their join columns, respectively; and l. merge join the sorted rows of T1 and T2.

41. The computer program of claim 34, wherein T1 and T2 are ordered by a date value.

42. The computer program of claim 34, wherein T1 and T2 each have one or more primary index columns and the join command specifies equality of the primary index columns as a condition of the join.

43. The computer program of claim 42, wherein the one or more primary index columns is a single column containing numeric values of 8 bytes or less.

44. The computer program of claim 34, wherein T1 has a unique primary index.

45. The computer program of claim 34, wherein T1 and T2 are portions of larger tables and are stored in a single storage facility.

46. The computer program of claim 34, further comprising executable instructions that cause a computer to:
   j. record the maximum and minimum difference between the ordering columns of T1 and T2 for matching rows.

47. The computer program of claim 34, wherein the join command specifies one or more conditions on rows of T2 and causing a computer to increment the not-match counter comprises causing it to increment the not-match counter only when the loaded row of T2 meets the conditions.

48. The computer program of claim 34, wherein the join command specifies one or more join columns for T1 and T2, further comprising executable instructions that cause a computer to:
   j. reset the not-match counter in the event of a match;
   k. halt the repetition of steps a–h when the not-match counter exceeds a predetermined limit;
   l. sort rows of T1 and T2 based at least in part on their join columns, respectively; and,
   m. merge join the sorted rows of T1 and T2.

49. The computer program of claim 48, wherein the rows of T1 and T2 are sorted by a hash of their join columns.

50. The computer program of claim 34, wherein the join command specifies one or more conditions on-rows of T1, rows of T2, and combined rows of T1 and T2, and causing a computer to output a match comprises causing a computer to output a combined row including one or more columns from the matched rows of T1 and T2 if each of the matched rows meets the conditions specified for rows from that table and the combined row meets the conditions for combined rows.

* * * * *